United States Patent
Bolstad et al.

[19]

[11] Patent Number: 5,842,034
[45] Date of Patent: Nov. 24, 1998

US005842034A

[54] TWO DIMENSIONAL CROSSBAR MESH FOR MULTI-PROCESSOR INTERCONNECT

[75] Inventors: Gregory L. Bolstad, Orange; Christopher W. Reed, Los Angeles; Charles J. Robie, Fullerton, all of Calif.

[73] Assignee: Raytheon Company, Lexington, Mass.

[21] Appl. No.: 770,401

[22] Filed: Dec. 20, 1996

[51] Int. Cl.[6] .................................................. G06F 13/00
[52] U.S. Cl. ............................ 395/800.11; 395/800.12; 395/800.13
[58] Field of Search .......................... 395/800.11, 800.12, 395/800.13, 800.15, 800.22

[56] References Cited

U.S. PATENT DOCUMENTS

| | | | |
|---|---|---|---|
| 5,058,001 | 10/1991 | Li | 364/200 |
| 5,133,073 | 7/1992 | Jackson et al. | 395/800 |
| 5,157,785 | 10/1992 | Jackson et al. | 395/800 |
| 5,485,627 | 1/1996 | Hillis | 395/800 |
| 5,566,342 | 10/1996 | Denneau et al. | 395/800 |

*Primary Examiner*—Alyssa H. Bowler
*Assistant Examiner*—Mackly Monestime
*Attorney, Agent, or Firm*—Leonard A. Alkov; Glenn H. Lenzen, Jr.

[57] ABSTRACT

A parallel processor array with a two-dimensional crossbar switch architecture. Individual processing elements are configured as clusters of processors, wherein the individual processing elements within each cluster are interconnected by a two dimensional cluster network of crossbar switch elements. The clusters are interconnected via a two dimensional array network of crossbar switch elements, supporting high-bandwidth inter-processor data shuffles that characterize parallel implementations of sensor processing problems. Input data is supplied directly into the array network of crossbar switch elements, which allows an optimal initial partitioning of the data set among the processing elements. The array architecture supports a virtual array sizing, where the processor array can be treated as a variable sized array with dimensions that are software controllable, selectable to match system characteristics.

16 Claims, 5 Drawing Sheets

TWO DIMENSIONAL CROSSBAR MESH FOR MULTI-PROCESSOR INTERCONNECT

TECHNICAL FIELD OF THE INVENTION

The invention relates to parallel processor architectures for applications such as sensor processing, and more particularly to a crossbar switch interconnect architecture with a large number of individual processing elements configured as clusters of processors.

BACKGROUND OF THE INVENTION

Multi-dimensional sensor signal processing algorithms often operate on a "cube" of sensor data. As an example, the three dimensions of the cube may be element (beam) space, PRI (Doppler) space, and range space. To achieve the absolute lowest processing latency on a parallel processor, the cube of data should nearly always be fully and evenly distributed to all processing elements, such that all processing elements are working on portions of the same data cube for the fully coherent processing interval (CPI). The cube of data must be initially partitioned among multiple processors, and possibly re-partitioned several times through the course of the processing, according to the particular requirements of the processing algorithm. This means that at any instant, each processor typically has access to the full data set in only one dimension.

In the case of most processing algorithms, this mapping results in the need to perform processing in one dimension (Doppler space, for example), and then immediately following this, perform processing in another dimension (channel space, for example). This requires that a "perfect shuffle" data movement be performed among multiple processing elements to transform one data distribution to another, where each PE within a row (or column) exchanges data with every other PE in the same row (or column).

Commonly used interconnect topologies for large parallel processing systems include nearest-neighbor connected 2-D arrays (2-D mesh), and tree-connected processor arrays. Nearest neighbor connected meshes suffer from the basic problem of blocking. Low latency sensor processing mappings onto multi-processor machines result in the need to shuffle data among many processors simultaneously. Nearest neighbor meshes do not support this type of shuffling very well because any single node-to-node transfer consumes all of the intermediate communication links for the duration of the transfer, resulting in very low overall parallelism for the data shuffling operations and poor performance. Blocking grows increasingly worse for larger systems.

Tree-connected crossbar switch topologies offer a potential for reasonable performance when applied to space-time adaptive processing (STAP) problems. But they are inherently less scalable due to the large number of switching elements needed to interconnect processors. Tree connected topologies also suffer from increased potential for undesirable interactions between unrelated data movements in a system because many seemingly unrelated communication paths come together as the "base" of the tree.

SUMMARY OF THE INVENTION

A parallel processor array is described, wherein a first plurality of processor elements is configured as a second plurality of clusters of processing elements. An interconnection network is provided for interconnecting the processor clusters. The network includes a two-dimensional mesh of multi-port crossbar switch elements arranged in rows and columns in a crossbar mesh network. Each crossbar switch element includes a third plurality of ports and controllable switching for operatively connecting one port of the crossbar switch element to another port of the crossbar switch element. Each processor cluster is connected to a port of a row crossbar switch element and to a port of a column crossbar switch element. An input data set to be processed is supplied directly into the network via crossbar switch element input ports for initial partitioning of the data set among the processing elements.

Because each port of a crossbar switch element can be connected to any other port of the switch element in a non-blocking manner, input data cubes can be shuffled using single dimension data movements to effect transposition of the data cube dimensions within the array.

BRIEF DESCRIPTION OF THE DRAWING

These and other features and advantages of the present invention will become more apparent from the following detailed description of an exemplary embodiment thereof, as illustrated in the accompanying drawings, in which:

FIG. 3A illustrates an exemplary sensor data cube. FIG. 3B shows the data shuffle accomplished using the 2-D crossbar network configured as shown in FIG. 3C.

DETAILED DESCRIPTION OF THE PREFERRED EMBODIMENT

Figure 1:
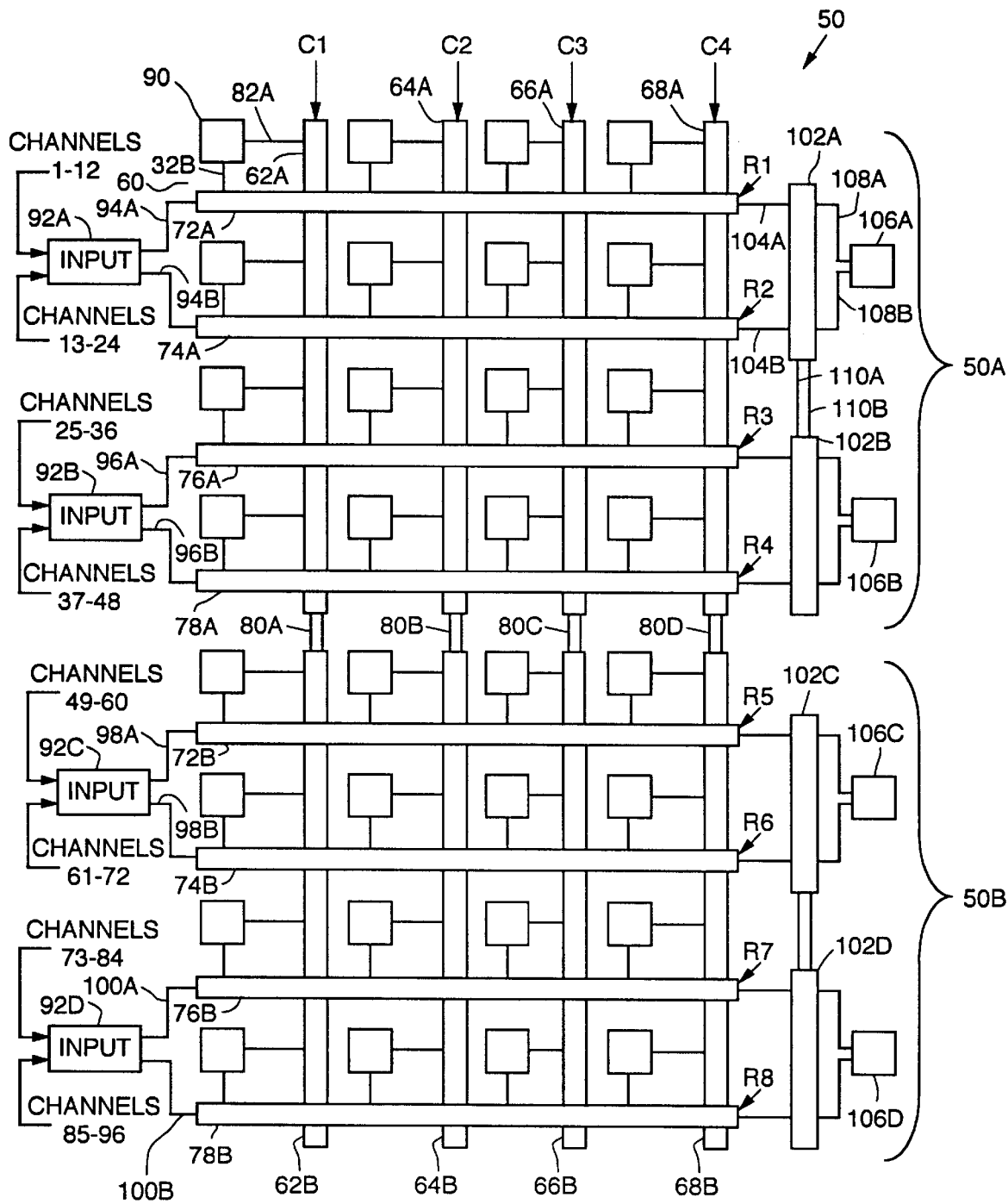
FIG. 1 is a schematic diagram of an exemplary implementation of a processor array network with a two-dimensional (2-D) crossbar mesh architecture embodying the invention.

A processor array employing a two-dimensional (2-D) array crossbar switch network in accordance with an aspect of the invention well supports the high-bandwidth interprocessor data "shuffles" that are fundamental to efficient distributed sensor processing. An exemplary embodiment of a processor array 50 in a 2-D crossbar switch network is shown in FIG. 1. The 2-D array crossbar mesh, generally indicated as 60, comprises rows and columns of 6 port crossbar switch elements. The number of ports for the crossbar elements is arbitrary, and could be any number; 6 port switch elements are employed in this exemplary embodiment. In this example, there are four columns C1–C4 of crossbar switch elements arranged as upper crossbar switch elements 62A–68A and lower crossbar switch elements 62B–68B, and the upper rows R1–R4 of crossbar switch elements 72A–78A and the lower rows R5–R8 of crossbar switch elements 72B–78B. Each crossbar element in this exemplary embodiment is a 6 port, 480 mb/sec crossbar switch element. Parts suitable for use as these switch elements are commercially available. One exemplary device is the part CY7C965 marketed by Cypress Semiconductor Corporation.

The rows and columns of crossbar switch elements are arranged to form two square sub-arrays 50A, 50B. The respective upper and lower columns of crossbar switches in this exemplary embodiment are interconnected by dual 160 mbyte/sec communication links 80A–80D. For example, crossbar switch 62A is connected to crossbar switch 62B by dual communication link 80A.

The crossbar mesh interconnects to the plurality of processing clusters 90. Each processing cluster in this exemplary embodiment comprises 16 processing elements (PEs), and is connected to a given adjacent row and column of the crossbar switches by communication links 82A, 82B. The communication links connect to respective ports of the crossbar switch elements.

In the example of FIG. 1, there are 16 processing clusters 90 interconnected by the crossbar mesh of the first sub-array 50A, and 16 processing clusters interconnected by the crossbar mesh of the second sub-array 50B.

Input ports of the row crossbar switch elements are connected to corresponding sets of channels from the sensor system. Thus, input devices 92A–92D couple between the sensor channels and the input ports to the row crossbar switch elements. The input devices function as de-multiplexing, signal routing elements. Device 92A connects data channels 1–12 and 13–24 to rows R1 and R2 via communication links 94A, 94B. Device 92B couples data channels 25–36 and 37–48 to rows R3 and R4 via communication links 96A, 96B. Device 92C couples data channels 49–60 and 61–72 to rows R5 and R6 via communication links 98A, 98B. Device 92D couples data channels 73–84 and 85–96 to rows R7 and R8 via communication links 100A, 100B.

Output ports of the row crossbar switch elements of each sub-array are interconnected to each other and to processing modules for additional processing functions, in this exemplary implementation, for high-performance adaptive weight computations. The output port for switch element 72A is connected to crossbar switch element 102A via communication link 104A. The output port for switch element 72B is connected to the switch element 102A via communication link 104B. The switch element 102A is in turn connected to processing module 106A via communication links 108A, 108B. Similar connections are made between the output ports for switch elements 76A and 78A, the crossbar switch element 102B and the processing module 106B. In addition, bi-directional communication links 110A, 110B interconnect ports of the switch elements 102A, 102B. Similar connections are made at the output ports of the rows for the sub-array 50B, the switch elements 102C and 102D, and the processing modules 106C, 106D. The output crossbar switches allow processing modules 106A–106D to communicate with multiple rows of the crossbar mesh. The processing modules can, for example, be programmable processor systems for performing high performance adaptive weight computations, as described in commonly assigned application Ser. No. 08/321,278, filed Oct. 11, 1994 as "High Performance Weight Computation System" by G. D. Bolstead et al.

Each crossbar switch is a multi-port switch, which enables any port to be selectively connected to another port of the crossbar switch. For crossbar switch 62A, for example, two of its ports are connected to corresponding ports of the switch 62B via dual communication links 80A. The other four ports for switch 62A are connected to a respective one of the processing clusters 90 via a communication link 82A. In this way, the switch 62A can be controlled, for example, to connect any one of the four processing clusters connected to its ports to any other of the four processing clusters, or, through the dual communication link 80A, to any of the four processing clusters connected to ports of the lower column crossbar switch 62B. Each of the other crossbar switches can be similarly configured.

The row crossbar switches are not directly connected to the column crossbar switches. However, each processing cluster 90 is connected to a port of a row switch and to a port of a column switch, permitting data transfer from a processing cluster either horizontally or vertically.

As an example, data may be distributed vertically across the array 50, partitioned by channel, and horizontally across the array, partitioned by range. Consider the example illustrated in FIG. 2, wherein post Doppler processing is to be performed on the data. Thus, the sensor data is first passed through a Doppler filter 20, and is then subjected to a weight calculation and beamforming process 22. The resulting processed data is then passed to a Constant False Alarm and Detection (CFAR) process 24. Each processing element (PE) 120 (FIG. 3A) of each processing cluster 90 contains the full Doppler (or PRI) dimension and can process efficiently in that dimension (Doppler filtering, for example). The PEs comprising the processing clusters constitute an array of processing elements, shown in FIG. 2 as virtual processor array 130. In this example, each processing element 120 includes slices of the data cube 30 that include all of the Doppler dimensions for given range and/or element indices. But if the next processing step (weight calculation and beamforming, for example) is performed in the channel dimension, data is first exchanged vertically, using only the vertical cross-bar switch elements 62A–68A and 62B–68B. Similarly, if a subsequent processing step requires full data in the range dimension (CFAR thresholding, for example), a large amount of data must be interchanged between processors in each individual row, requiring the use of only the eight horizontal crossbar switch elements 72A–78A and 72B–78B.

Figure 2:
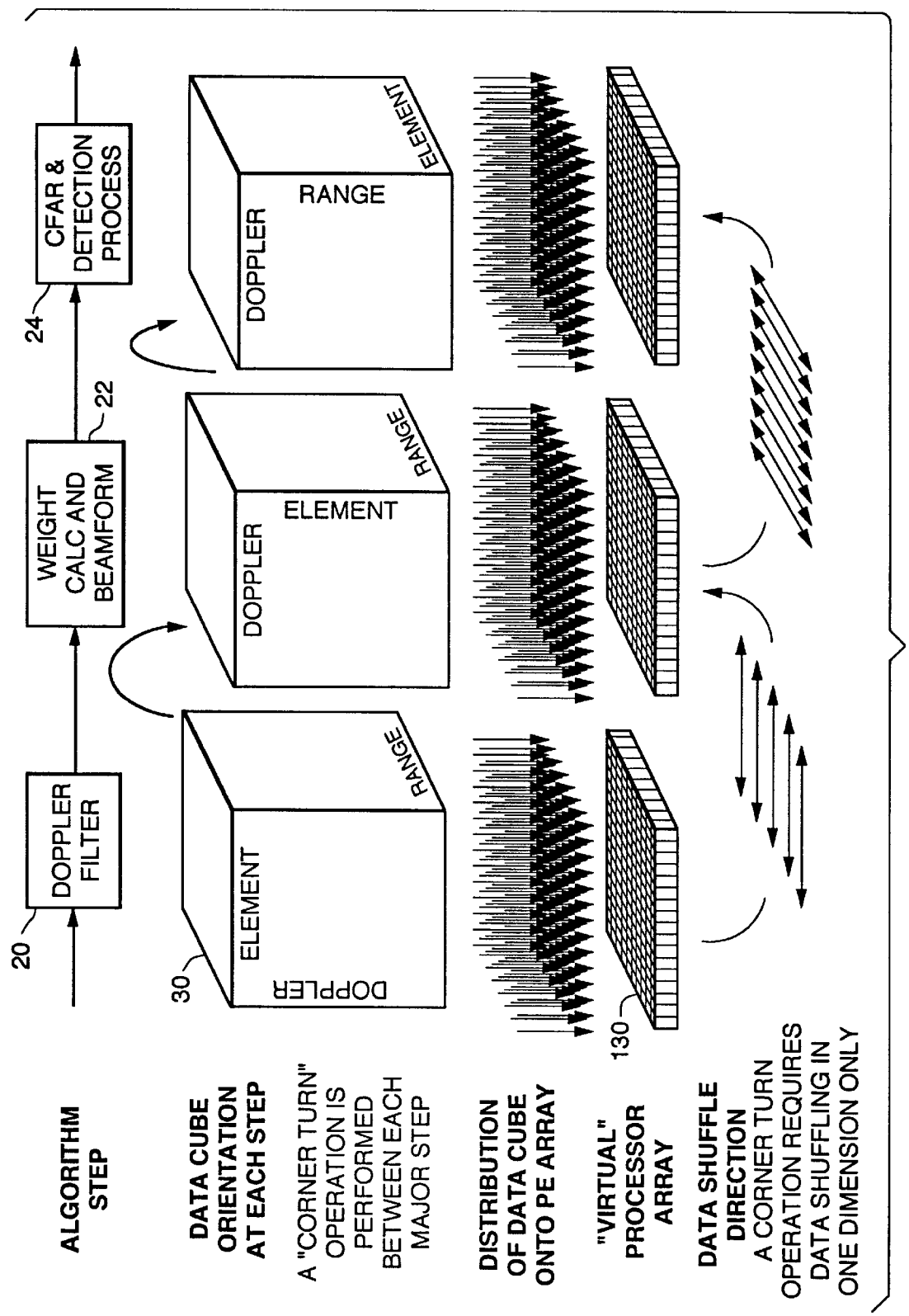
FIG. 2 is a diagrammatic depiction of sensor data cube re-mapping to the processor array performed by the array of FIG. 1.

As shown in FIG. 2, this sequence of data shuffles is analogous to "picking up" the three dimensional data cube 30 from the two dimensional processor array 130, rotating it 90° degrees, and then "setting it down" on the processor array. The capabilities of the 2-D network 60 of non-blocking switches, permitting multiple parallel data transfers in a single dimension of the crossbar mesh, exactly match these data movement requirements.

In general, any change of processing dimension, whether it be range to Doppler, (sensor) channel to Doppler, range to channel, etc., will either require high bandwidth data movement vertically or horizontally, but almost never in both directions, (i.e. very few diagonal movements). These individual, very high bandwidth, vertical and horizontal data movements are unique properties of the 2-dimensional cross-bar switch interconnect network.

Figure 3A:
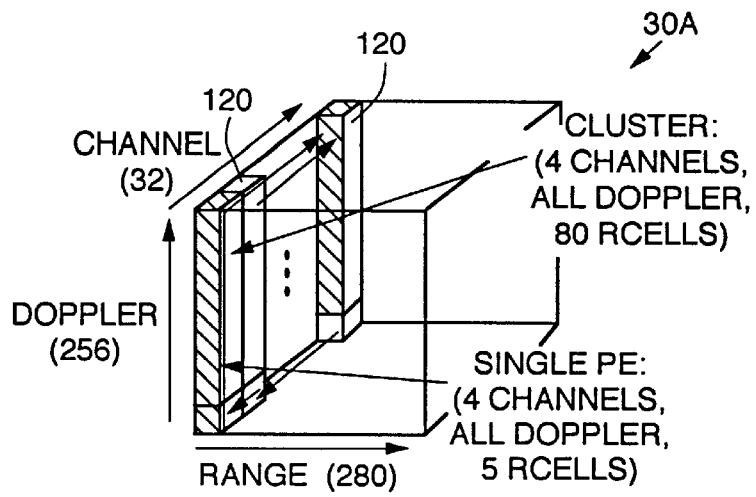
FIGS. 3A–3C show an exemplary processing example performed by the processor array of FIG. 1.
Figure 3B:
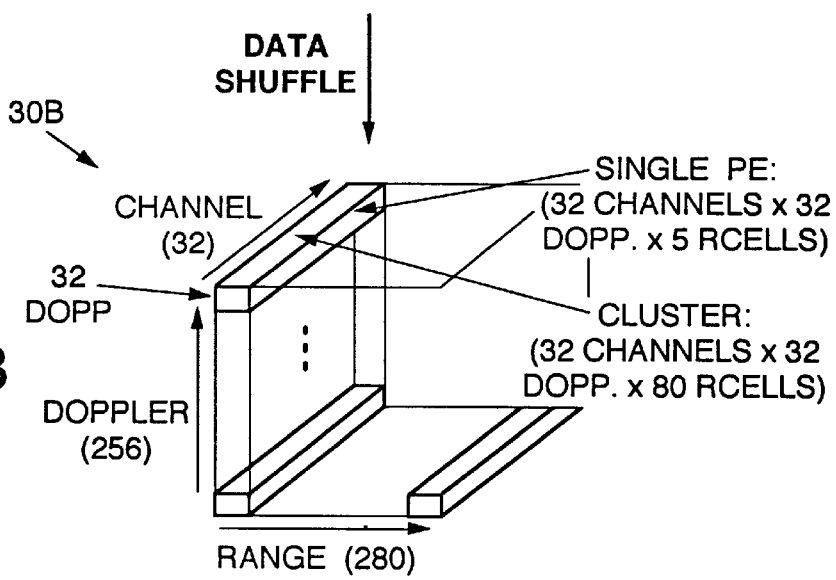
Figure 3C:
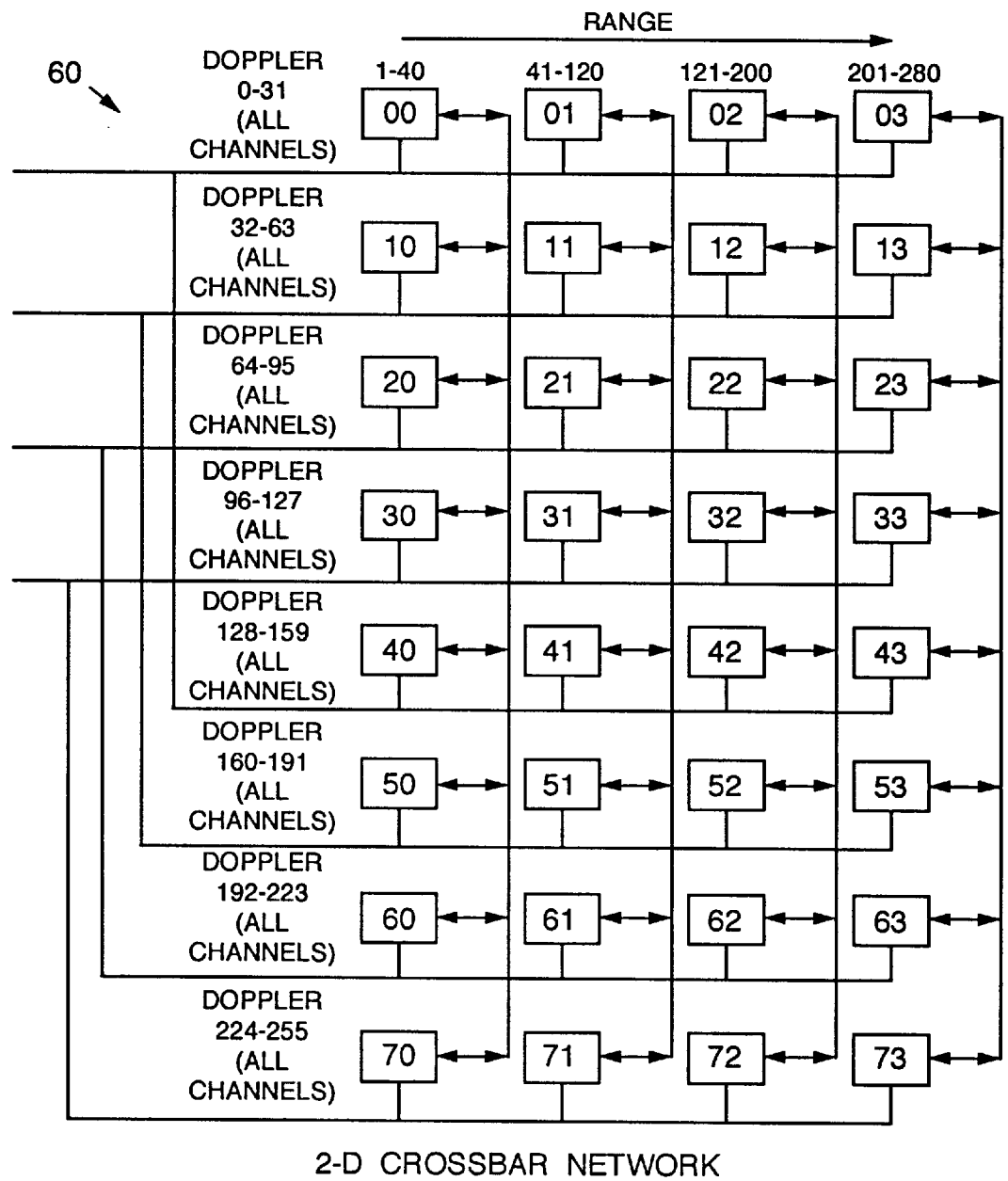

As a more detailed example, FIGS. 3A–3C show one step from the detailed mapping of an example application. In this example, each processing cluster 90 processes 4 channels, all Doppler and 80 Range cells. Each PE 120 of a processing cluster 90 in this example processes 4 channels, all Doppler bins and 5 Range cells. The data cube size in this example is 32 Channels by 256 Doppler bins by 280 Range cells. In this example, the Doppler and Channel dimensions must be transposed to allow the hardware to execute beamforming subsequent to Doppler filtering. FIG. 3A shows the data cube in form 30A prior to the data shuffle; FIG. 3B shows the data cube in form 30B after the data shuffle. The transposition is effected by a "Column" shuffle. Data within each column is shuffled independently and in parallel with the other columns. Many parallel data transfers are also performed within the independent columns Each PE 120 has 4 Channels by 256 Doppler by 5 Range cells, and will end with 32 Channels by 32 Doppler by 5 Range cells. There are 896 data transfers per column, i.e. 8 processor clusters times 16 PE/cluster times seven transfers per PE. The transfer size is 4 Channels by 32 Doppler by 5 Range cells times 8 bytes, or 5,120 bytes/transfer. Before the transfer, each PE 120 holds 4 channels by 256 Doppler by 5 range cells, and will end up with 32 channels by 32 Doppler by 5 range cells. Note the 5 range cells are the same range cells before and after the transfer. Therefore, each PE must divide the data up into 8 groups of 4 channels by 32 Doppler by 5 range cells prior to the transfer. It then retains one of these groups and sends the remaining 7 to the appropriate destination.

The 2-D architecture of the crossbar mesh network 60 is capable of performing data parallel shuffling in both the column and row dimensions, allowing efficient transpositions for typical data structures. FIG. 3C shows the configuration of the crossbar network which provides for the data shuffle from FIG. 3A to FIG. 3B.

Figure 4:
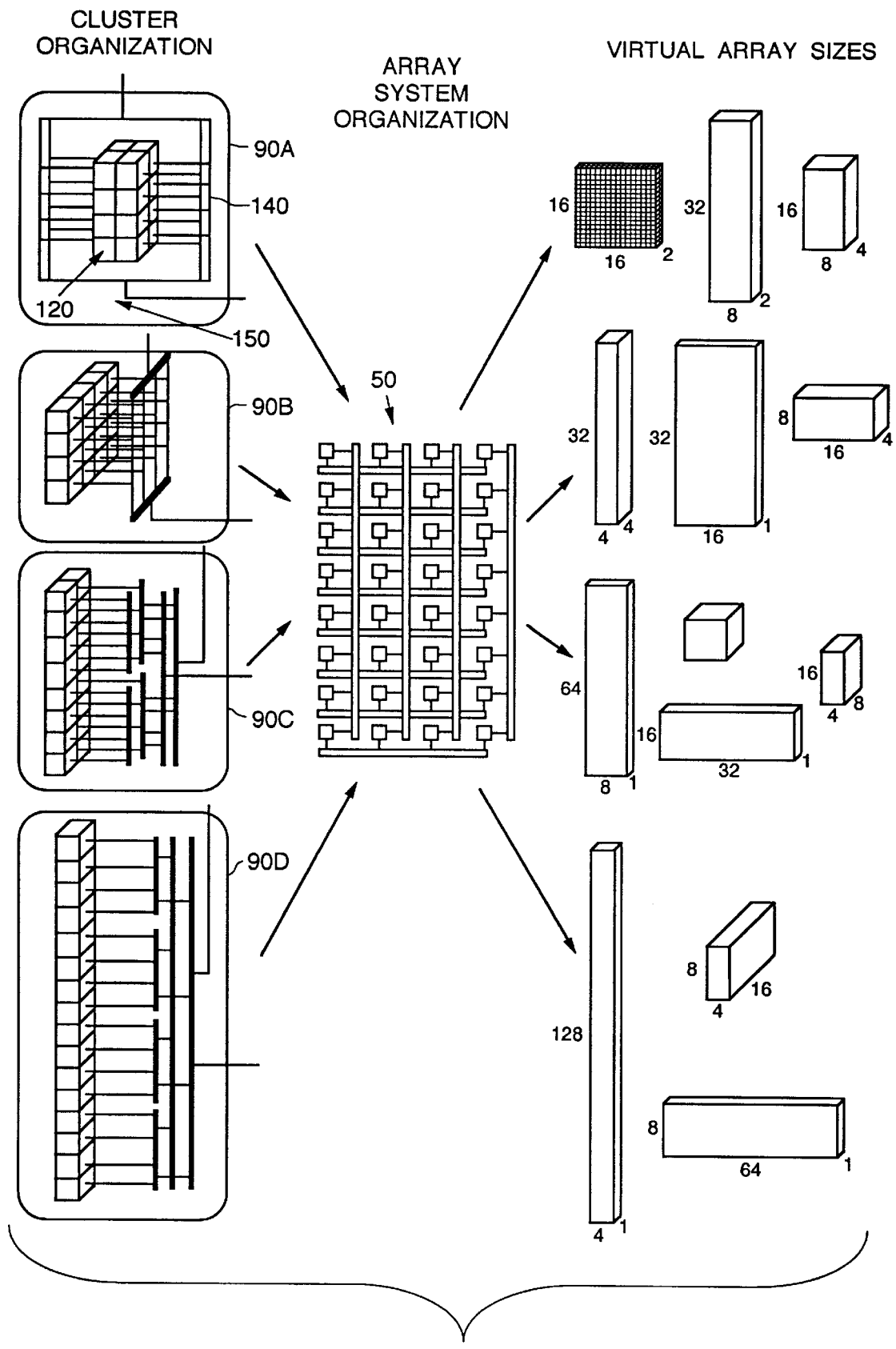
FIG. 4 is a diagrammatic depiction of a virtual array sizing which can be obtained using the array architecture of FIG. 1.

An aspect of the architecture is the notion of a "virtual array" size. That is, the processor array 130 of all the PEs in the array can be thought of not as a fixed size, but a variable sized array with dimensions that are software controllable and are adaptable to the particular processing scenario. FIG. 4 illustrates the concept. Because each processing cluster 90 contains 16 processing elements 120 interconnected by crossbar switch elements 140, a cluster 90 of PEs can be considered to be organized in several different ways. The interconnect 150 within the cluster is sufficiently flexible to allow the processing elements to be considered as a two or three dimensional "sub-array" of variable size, ranging from 2×2×4 (cluster 90A) to 1×4×4 (cluster 90B) to 1×2×8 (cluster 90C) to 16×1×1 (cluster 90D. The virtual array concept works because of two aspects of the architecture. First, the processing elements 120 are clustered, with each processing element within a cluster having equivalent access to both the X and Y interconnect ports into the external inter-cluster (2-D) array 60 of crossbar switch elements. And the interconnect resources within a cluster are sufficient to allow efficient intra-cluster data shuffling operations in any dimension of the configurations described above.

Note that both the intra-cluster data shuffling times and the inter-cluster (over the 2-D crossbar network) data shuffling times are essentially independent of the virtual organization of nodes within the clusters.

This virtual array concept is important to STAP processing because it allows the processor dimensions to be matched to the algorithm requirements "on-the-fly" without any physical reconfiguration of the processor. For example, the processing for a 64 channel, 64 PRI, 512 range-gate STAP system may map well to a 32×16 virtual processor array, while an 8 channel, 512 PRI, 256 range-gate STAP system would map better to an 8×64 processor array. This ability to vary (via software) the processor array virtual size is very useful in simplifying the conceptual mapping of processing for widely varying STAP systems.

Figure 5:
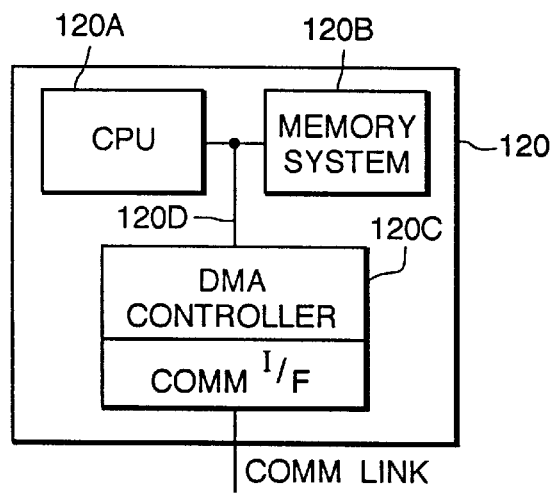
FIG. 5 is a simplified block diagram illustrative of the organization of the processing elements used in the array architecture of FIG. 1.

FIG. 5 is a simplified block diagram illustrative of the organization of the processing elements 120 used in the array architecture of FIG. 1. Each processing element includes a CPU 120A, a memory system 120B and a DMA controller and communication interface device 120C, interconnected by a bus 120D. Data communication with a processing element is established by a communication link 120E connected through the device 120C.

It is understood that the above-described embodiments are merely illustrative of the possible specific embodiments which may represent principles of the present invention. Other arrangements may be readily be devised in accordance with these principles by those skilled in the art without departing from the scope and spirit of the invention

What is claimed is:

1. A parallel processor array, comprising a first plurality of processor elements configured as a second plurality of clusters of processing elements, and an interconnection network for interconnecting the processor clusters, the network including a two-dimensional mesh of multi-port crossbar switch elements arranged in rows and columns in a crossbar mesh network, each crossbar switch element including a third plurality of ports and controllable switching for operatively connecting one part of the crossbar switch element to another port of the crossbar switch element, and wherein each processor cluster is connected to a port of a row crossbar switch element and to a port of a column crossbar switch element, and wherein an input data set to be processed is supplied directly into the network via crossbar switch element input ports for initial partitioning of the data set among the processing elements, said input data set being characterized as a three dimensional data cube, said three dimensional data cube being characterized as sensor data, a first data dimension represents a sensor channel dimension, a second data dimension represents a Doppler dimension, and a third data dimension represents a Range cell dimension, and wherein the interconnection network is configurable in an initial state such that the data set is initially distributed among the processing elements for processing in a first data dimension during a first processing function, and subsequently is configurable to perform a data dimension transposition of the data set for processing in a second data dimension by the processing elements during a second processing function.

2. The array of claim 1, wherein the column switch elements are configurable to distribute data independently within a mesh column and in parallel with data distributions in other columns, to thereby effect the data dimension transposition.

3. The array of claim 1 wherein each processing cluster includes an intra-cluster interconnection network of multi-port crossbar switch elements for interconnecting the processor elements comprising the processing cluster, the intra-cluster interconnection network adapted to provide each processing element of the cluster equal access to said port of said column crossbar switch element and said port of said row crossbar switch element to which said cluster is connected, and wherein each processing cluster is organizable as a variable sized sub-array of the processing elements comprising the processing cluster.

4. The array of claim 3, wherein a first sub-array size is a three dimensional cube of n processor elements by n processor elements by n processor elements.

5. The array of claim 4, wherein a second sub-array size is a one dimensional array of processor elements.

6. A parallel processor array, comprising:
   a first plurality of processor elements configured as a second plurality of programming cluster of processing elements;
   for each programming cluster, an intra-cluster interconnection network of multi-port crossbar switch elements for interconnecting the processor elements comprising the processing cluster, the intra-cluster interconnection network adapted to provide each processing element of the cluster equal access to said port of said column crossbar switch element and said port of said row crossbar switch element to which said cluster is connected, and wherein each processing cluster is organizable as a variable sized sub-array of the processing elements comprising the processing cluster;

an inter-cluster interconnection network for interconnecting the processor clusters with programmable high bandwidth data transmission links, the network including a two-dimensional mesh of multi-port crossbar switch elements arranged in rows and columns in a crossbar mesh network, each crossbar switch element including a third plurality of ports and controllable switching for operatively connecting one port of the crossbar switch element to another port of the crossbar switch element, wherein each processor cluster is connected to a port of a row crossbar switch element and to a port of a column crossbar switch element, and wherein an input data set to be processed is supplied directly into the network via crossbar switch element input ports for initial partitioning of the data set among the processing elements, wherein the input data set is characterized as a three dimensional data cube, wherein the data cube is characterized as sensor data, a first data dimension represents a sensor channel dimension, a second data dimension represents a Doppler dimension, and a third data dimension represents a Range cell dimension, and configurable in an initial state such that the data set is initially distributed among the processing elements for processing in a first data dimension during a first processing function, and subsequently is configurable to perform a data dimension transposition of the data set for processing in a second data dimension by the processing elements during a second processing function.

7. The array of claim 6, wherein the column switch elements are configurable to distribute data independently within a mesh column and in parallel with data distributions in other columns, to thereby effect the data dimension transposition.

8. The array of claim 6, wherein a first sub-array size is a three dimensional cube of n processor elements by n processor elements by n processor elements.

9. The array of claim 8, wherein a second sub-array size is a one dimensional array of processor elements.

10. A parallel processor array, comprising a first plurality of processor elements configured as a second plurality of clusters of processing elements, and an interconnection network for interconnecting the processor clusters, the network including a two-dimensional mesh of multi-port crossbar switch elements arranged in rows and columns in a crossbar mesh network, each crossbar switch element including a third plurality of ports and controllable switching for operatively connecting one port of the crossbar switch element to another port of the crossbar switch element, wherein the row crossbar switch elements each include an input port for receiving input data of the data set, and an output port for transferring data out of the row switch element, and wherein each processor cluster is connected to a port of a row crossbar switch element and to a port of a column crossbar switch element, and wherein an input data set to be processed is supplied directly into the network via crossbar switch element input ports for initial partitioning of the data set among the processing elements, and a third plurality of processing modules to perform subsequent processing of data by said array processing elements, and a fourth plurality of multi-port output crossbar switch elements connected between the row output ports and the processing modules to allow each processing module to communicate with multiple row switch elements.

11. The array of claim 10 wherein each processing cluster includes an intra-cluster interconnection network of multi-port crossbar switch elements for interconnecting the processor elements comprising the processing cluster, the intra-cluster interconnection network adapted to provide each processing element of the cluster equal access to said port of said column crossbar switch element and said port of said tow crossbar switch element and said port of said row crossbar switch element to which said cluster is connected, and wherein each processing cluster is organizable as a variable sized sub-array of the processing elements comprising the processing cluster.

12. The array of claim 11, wherein a first sub-array size is a three dimensional cube of n processor elements by n processor elements by n processor elements.

13. The array of claim 12, wherein a second sub-array size is a one dimensional array of processor elements.

14. A parallel processor array, comprising:

a first plurality if processor elements configured as a second plurality of programming clusters of processing elements;

for each programming cluster, an intra-cluster interconnection network of multi-port crossbar switch elements for interconnecting the processor elements comprising the processing cluster, the intra-cluster interconnection network adapted to provide each processing element of the cluster equal access to said port of said column crossbar switch element and said port of said row crossbar switch element to which said cluster is connected, and wherein each processing cluster is organizable as a variable sized sub-array of the processing elements comprising the processing cluster, wherein the row crossbar switch elements each include an input port for receiving input data of the data set, and an output port for transferring data out of the row switch element;

an inter-cluster interconnection network for interconnecting the processor clusters with programmable high bandwidth data transmission links, the network including a two-dimensional mesh of multi-port crossbar switch elements arranged in rows and columns in a crossbar mesh network, each crossbar switch element including a third plurality of ports and controllable switching for operatively connecting one port of the crossbar switch element to another port of the crossbar switch element, wherein each processor cluster is connected to a port of a row crossbar switch element and to a port of a column crossbar switch element, and wherein an input data set to be processed is supplied directly into the network via crossbar switch element input ports for initial partitioning of the data set among the processing elements; and a third plurality of processing modules to perform subsequent processing of data by said array processing elements, and a fourth plurality of multi-port output crossbar switch elements connected between the row output ports and the processing modules to allow each processing module to communicate with multiple row switch elements.

15. The array of claim 14, wherein a first sub-array size is a three dimensional cube of n processor elements by n processor elements by n processor elements.

16. The array of claim 15, wherein a second sub-array size is a one dimensional array of processor elements.

* * * * *